P. DESSAULES.
TRACTOR.
APPLICATION FILED JAN. 7, 1918.
1,336,823.
Patented Apr. 13, 1920.
2 SHEETS—SHEET 1.
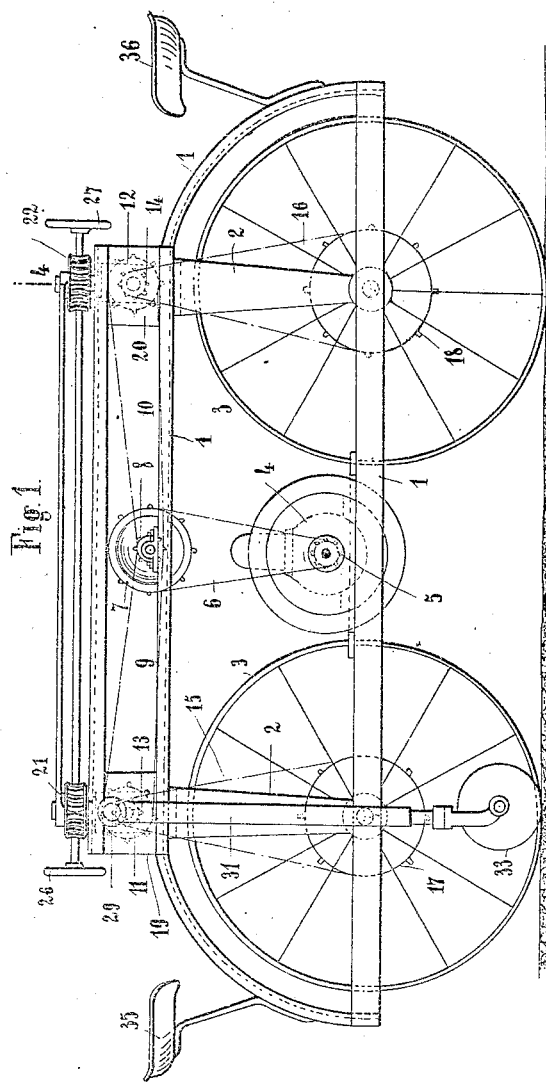
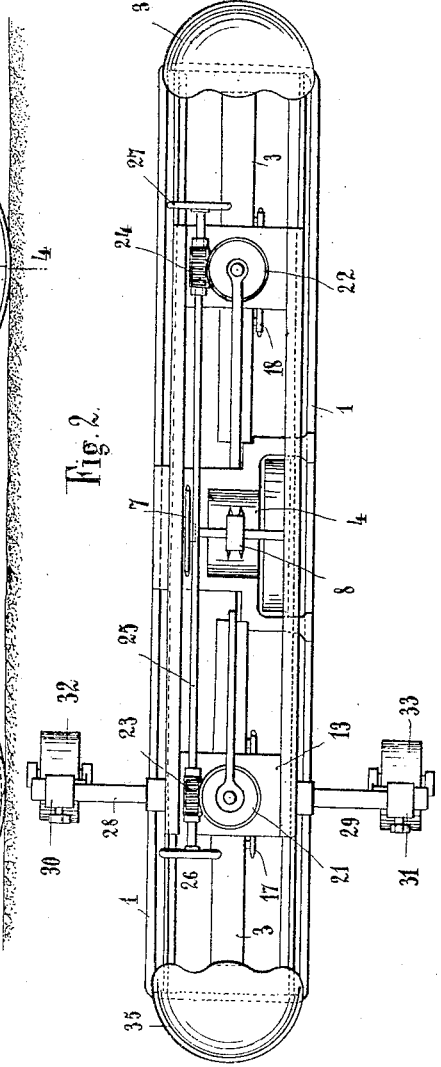
INVENTOR.
Paul Dessaules
BY
ATTORNEY.

P. DESSAULES.
TRACTOR.
APPLICATION FILED JAN. 7, 1918.

1,336,823.

Patented Apr. 13, 1920.
2 SHEETS—SHEET 2.

INVENTOR
Paul Dessaules
BY
ATTORNEY

UNITED STATES PATENT OFFICE.

PAUL DESSAULES, OF NANTERRE, FRANCE.

TRACTOR.

1,336,823.      Specification of Letters Patent.      Patented Apr. 13, 1920.

Application filed January 7, 1918. Serial No. 210,758.

*To all whom it may concern:*

Be it known that I, PAUL DESSAULES, a citizen of the Republic of France, and resident of Nanterre, (Seine,) France, (post-office address 14 rue de Courbevoie,) have invented a new and useful Tractor, which tractor is fully set forth in the following specification.

The present invention relates to a tractor which, without having to turn around, can return by working in the opposite direction to the end of the field, thus utilizing the two journeys of going and returning in a useful manner.

With this end in view the driving wheels, which are likewise the steering wheels, are placed tandem, one or two small side wheels serving to maintain the tractor in its vertical position.

The accompanying drawing shows by way of example one constructional form of the invention.

Figure 1 is a side view of the tractor, of which Fig. 2 is a plan.

Figure 3:
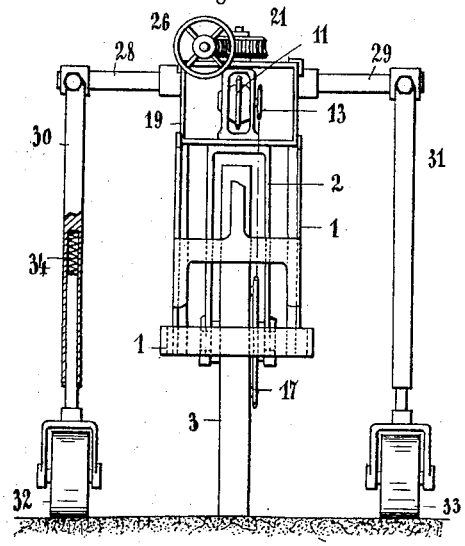
Fig. 3 is a front view.
Figure 4:
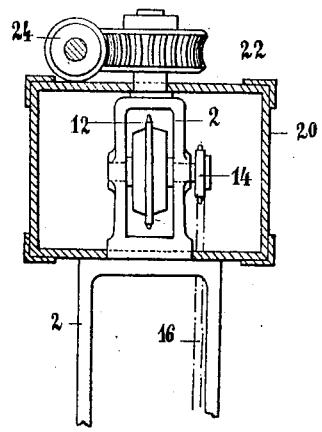
Fig. 4 is a partial section on line 4—4 of Fig. 1.

As indicated by Figs. 1, 2, 3 and 4, the frame 1 of the tractor is provided with two forks 2, between the arms of which are located the two supporting wheels 3, which also serve both as driving wheels and as steering wheels. These wheels are mounted at the extremities of the frame, in the same vertical plane, in a like manner to the wheels of a bicycle.

A suitable petrol motor, steam motor or the like 4, is mounted on the frame 1. To its shaft is keyed a sprocket wheel 5, which, through the medium of a chain 6, actuates a sprocket wheel 7, the shaft of the latter wheel being mounted in the upper part of the frame above the motor shaft and having fixed to it a double toothed sprocket wheel 8. This sprocket wheel 8 actuates, by means of two chains 9 and 10, two sprocket wheels 11 and 12, revolving in the upper extremities of the forks 2.

To the axles carrying the sprocket wheels 11 and 12 are keyed two driving sprocket wheels 13 and 14, which, through the medium of two chains 15 and 16 actuate two sprocket wheels 17 and 18, which are fastened to the shaft or axles of the two supporting wheels 3.

The chains and sprocket wheels may be replaced by bevel wheels or any other gearing.

The two forks 2 which carry the wheels 3 may revolve in two boxes, 19 and 20, rigidly connected to the frame 1.

The forks are provided with a worm wheel 21 and 22 gearing with two worms 23 and 24 mounted on a rod 25 provided with hand wheels 26 and 27. By means of these hand wheels and the worms and worm wheel gearing, the forks 2 may be turned together with the wheels 3 and 4, and the tractor can thereby be steered.

Furthermore the frame is provided with two laterally projecting members 28 and 29, carrying two supports 30 and 31, which carry at their lower extremities two small wheels or rollers 32 and 33. The distance between the two rollers may be adjusted by making the supports 30, 31, slide over the projecting side members 28, 29. The rollers may be vertically displaceable and for this purpose, each of the two supports 30 and 31 is of hollow formation and carries internally the stem of the fork in which the wheel or roller is mounted while each support is furthermore provided with a spring 34, which gives the wheel a resilient movement.

At the ends of the frame 1 seats 35 and 36 are fixed.

In practice, when the tractor reaches the edge of a field, the driver leaves his seat and takes up his position on the other seat. All that is then necessary in order to cause the tractor to operate in the opposite direction, is to reverse the motor by means of any suitable gearing.

By reason of the adjustable mounting of the two rollers aforesaid, the distance between them may be varied in such a way that they pass during the breaking of the ground between the furrows. Similarly, for vineyard work, the distance between the two supports may be adjusted in such a way that the vine-stocks pass between the driving or steering wheels and the side supporting wheels. One of the supports may even be omitted.

It is obvious that the tractor may serve for moving various agricultural machines or other farm implements or for drawing a load of any kind.

What I claim and desire to secure by Letters Patent of the United States is:—

1. In a tractor, the combination of a frame; a bearing box rigidly mounted in each end thereof; a vertically-disposed fork rotatably mounted in each bearing box; a pair of traction wheels mounted between the arms of said forks to turn therewith, said wheels normally occupying a common vertical plane; a worm wheel secured to each fork; a steering rod disposed longitudinally of the frame and having a pair of worms thereon for engagement with said worm wheels, to turn both forks and traction wheels simultaneously when said rod is rotated; a motor mounted on said frame between said traction wheels; a pair of driving chains, one for each traction wheel, leading in opposite directions from the motor toward said traction wheels and connected with said motor to be driven simultaneously thereby; a chain leading from each first-named chain to the adjacent traction wheel to drive the latter from the former; a pair of vertical supports arranged on opposite sides of said frame and a pair of ground wheels rotatably connected with the lower end of said supports to maintain the tractor in vertical position.

2. In a tractor, the combination of a frame; a bearing box rigidly mounted in each end thereof; a vertically-disposed fork rotatably mounted in each bearing box; a pair of traction wheels mounted between the arms of said forks to turn therewith, said wheels normally occupying a common vertical plane; means for turning both forks and traction wheels simultaneously; a motor mounted on said frame between said traction wheels; driving connections leading in opposite directions from said motor to said traction wheels to drive them simultaneously; a pair of horizontal members projecting laterally from opposite sides of said frame; a pair of depending supports slidably carried at their upper ends by said horizontal members for adjustment toward and from each other, each of said supports consisting of upper and lower telescopically-connected sections; a ground wheel carried by each lower section; and a spring arranged within each upper section to bear against the end of the corresponding lower section.

In testimony whereof I have signed this specification in the presence of two subscribing witnesses.

PAUL DESSAULES.

Witnesses:
EMILE LEDRET,
CHAS. P. PRESSLY.